United States Patent [19]

Flaig et al.

[11] Patent Number: 5,105,424
[45] Date of Patent: Apr. 14, 1992

[54] INTER-COMPUTER MESSAGE ROUTING SYSTEM WITH EACH COMPUTER HAVING SEPARATE ROUTING AUTOMATA FOR EACH DIMENSION OF THE NETWORK

[75] Inventors: Charles M. Flaig, Pasadena; Charles L. Seitz, San Luis Rey, both of Calif.

[73] Assignee: California Institute of Technology, Pasadena, Calif.

[21] Appl. No.: 201,682

[22] Filed: Jun. 2, 1988

[51] Int. Cl.⁵ .............................................. H04J 3/26
[52] U.S. Cl. ................................. 370/94.1; 370/94.3; 364/284; 364/284.3; 364/242.94; 364/DIG. 1
[58] Field of Search ... 364/200 MS File, 900 MS File; 370/94.1, 94.3

[56] References Cited

U.S. PATENT DOCUMENTS

| | | | |
|---|---|---|---|
| 4,032,899 | 6/1977 | Jenny | 364/200 |
| 4,466,060 | 8/1984 | Riddle | 364/200 |
| 4,516,238 | 5/1985 | Huang | 370/60 |
| 4,621,359 | 11/1986 | McMillen | 370/60 |
| 4,731,878 | 3/1988 | Vaidya | 370/60 |
| 4,742,511 | 5/1988 | Johnson | 370/94.1 |
| 4,763,321 | 8/1988 | Calvignac et al. | 370/94.1 |
| 4,774,706 | 9/1988 | Adams | 370/94.1 |
| 4,780,873 | 10/1988 | Mattheyses | 370/94.1 |
| 4,782,485 | 11/1988 | Gollub | 370/94.1 |
| 4,797,880 | 1/1989 | Bussey | 370/60 |
| 4,797,882 | 1/1989 | Maxemchuk | 370/94.1 |
| 4,805,091 | 2/1989 | Theil | 364/200 |
| 4,811,210 | 3/1989 | McAulay | 364/200 |
| 4,813,037 | 5/1989 | Debuysscher | 370/94.1 |
| 4,814,980 | 3/1989 | Peterson | 364/200 |
| 4,825,206 | 4/1989 | Brice | 370/94.1 |
| 4,890,281 | 12/1989 | Balboni | 370/60 |
| 4,893,303 | 1/1990 | Nakamura | 370/60 |
| 4,899,334 | 2/1990 | Shimitu | 370/60 |
| 4,899,335 | 2/1990 | Johnson | 370/60 |
| 4,933,933 | 6/1990 | Dally | 370/60 |

Primary Examiner—Thomas C. Lee
Assistant Examiner—Eric Coleman
Attorney, Agent, or Firm—Edward O. Ansell; Donald A. Streck; Robert M. Wallace

[57] ABSTRACT

In a multicomputer, concurrent computing system having a plurality of computing nodes, this is a method and apparatus for routing message packets between the nodes. The method comprises providing a routing circuit at each node and interconnecting the routing circuits to define communications paths interconnecting the nodes along which message packets can be routed; at each routing circuit, forming routes to other nodes as a sequence of direction changing and relative address indicators for each node between the starting node and each destination node; receiving a message packet to be transmitted to another node and an associated destination node designator therefor; retrieving the route to the destination node from a memory map; adding the route to the destination node to the beginning of the message packet as part of a header; transmitting the message packet to the routing circuit of the next adjacent node on the route to the destination node; and at each intermediate node, receiving the message packet; reading the header; directing the message packet to one of two outputs thereof as a function of routing directions in the header, updating the header to reflect passage through the routing circuit; and at the destination node, stripping remaining portions of the header from the message packet; storing the message packet; and, informing the node that the message packet has arrived.

26 Claims, 6 Drawing Sheets

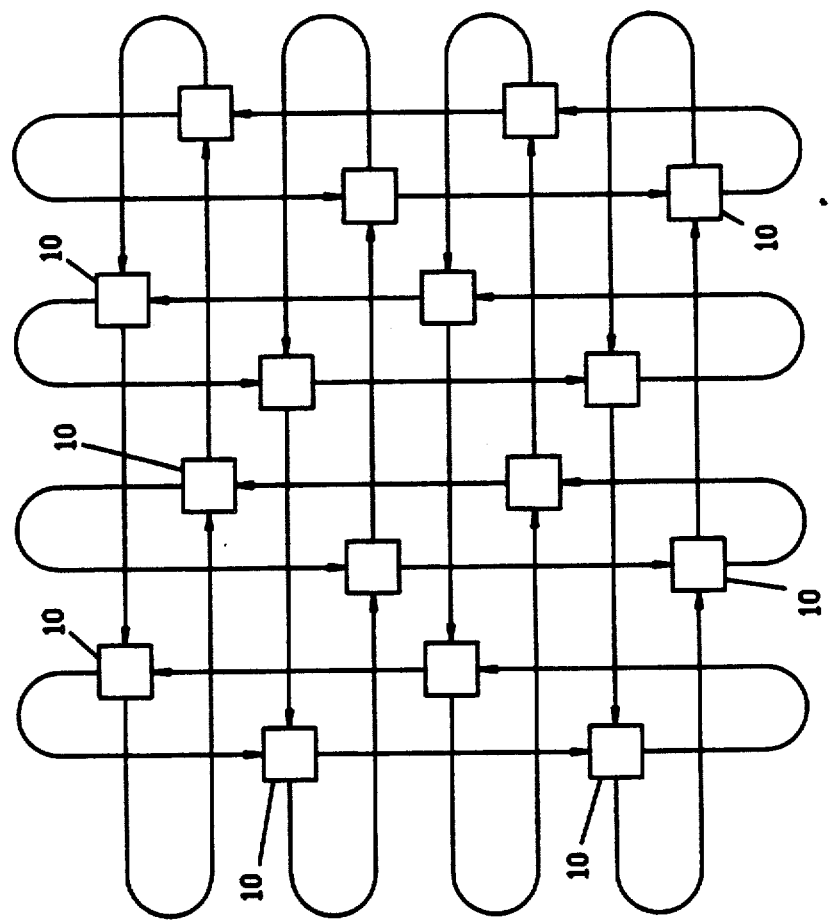
FIG. 3 PRIOR ART
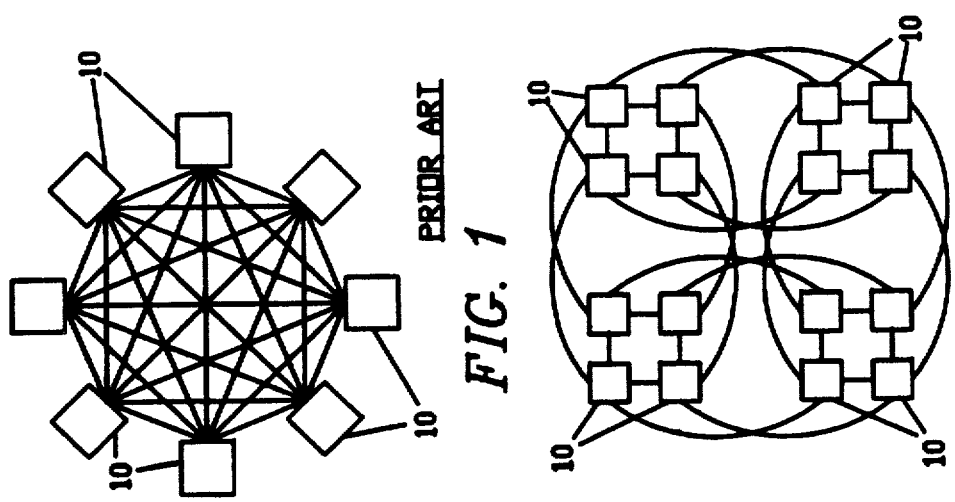
FIG. 1 PRIOR ART
FIG. 2 PRIOR ART

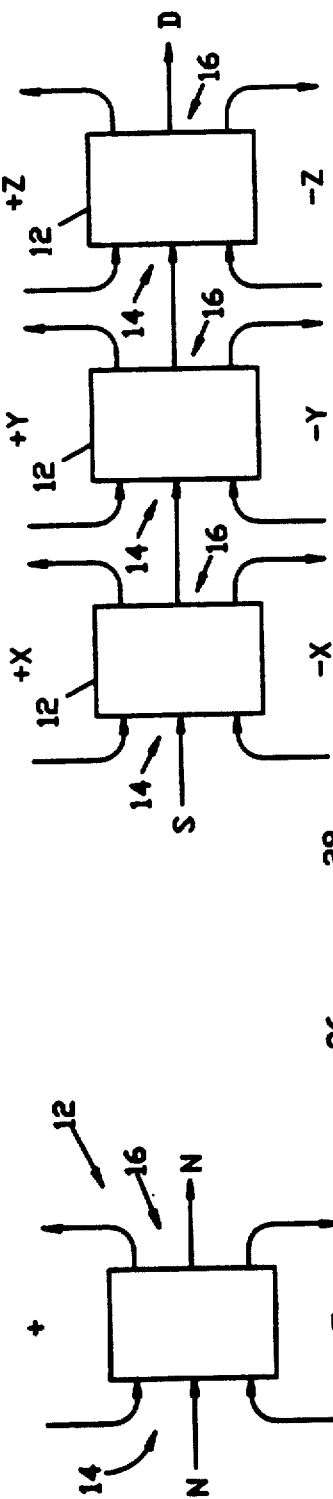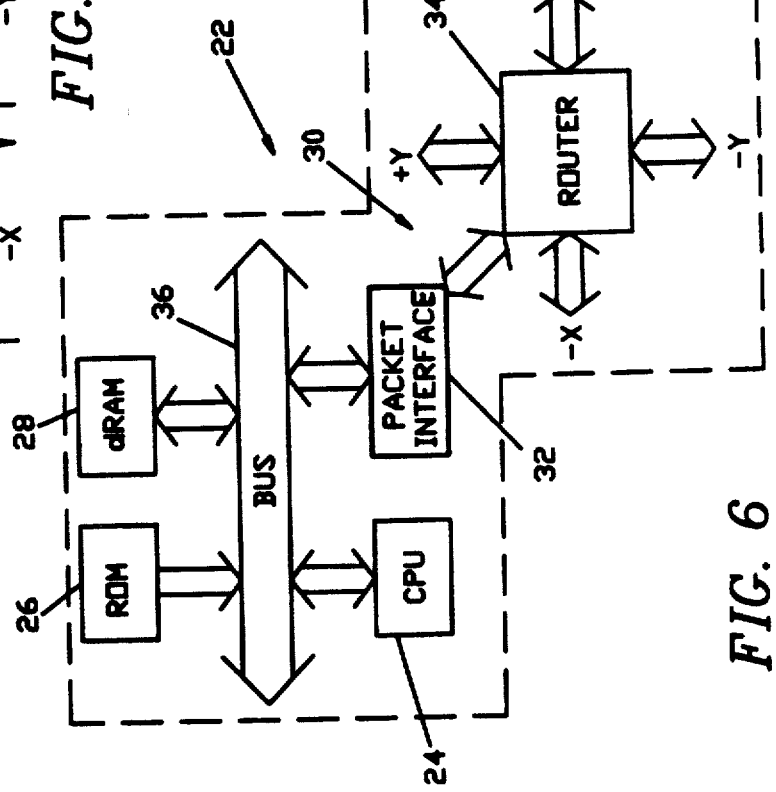

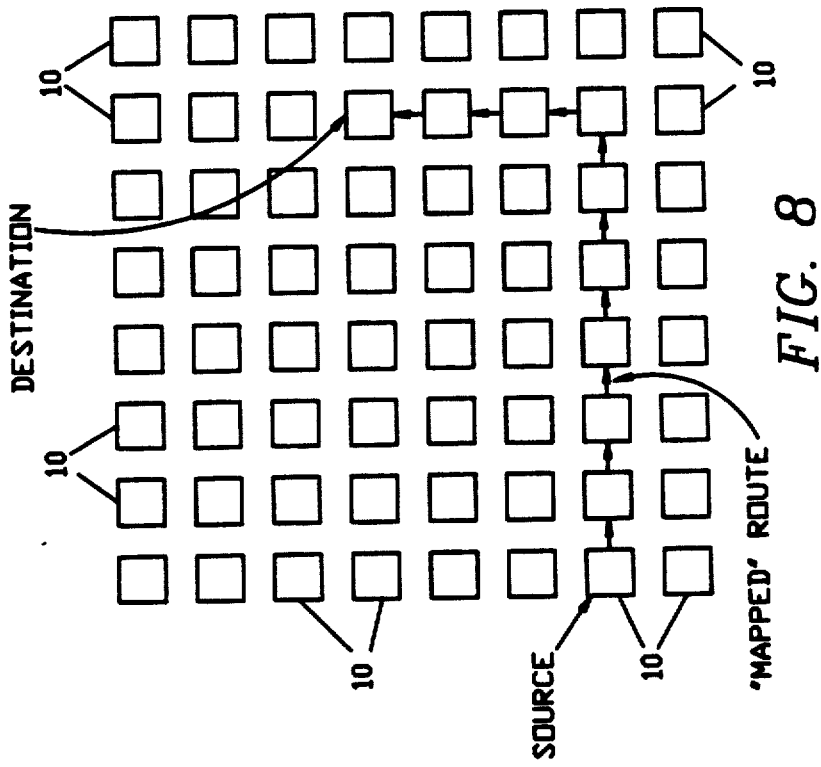
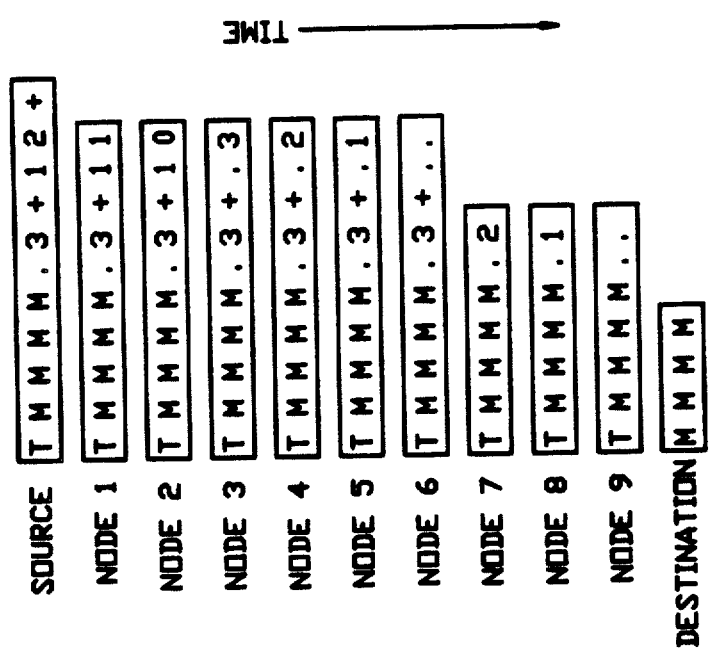
FIG. 8
FIG. 7
+ = CONTROL, TURN TO + DIRECTION
− = CONTROL, TURN TO − DIRECTION
. = CONTROL, LEADING ZERO
T = CONTROL, TAIL
0...3 = RADIX-4 RELATIVE ADDRESS
M = DATA FLIT, ONE OF THE SYMBOLS 0...3

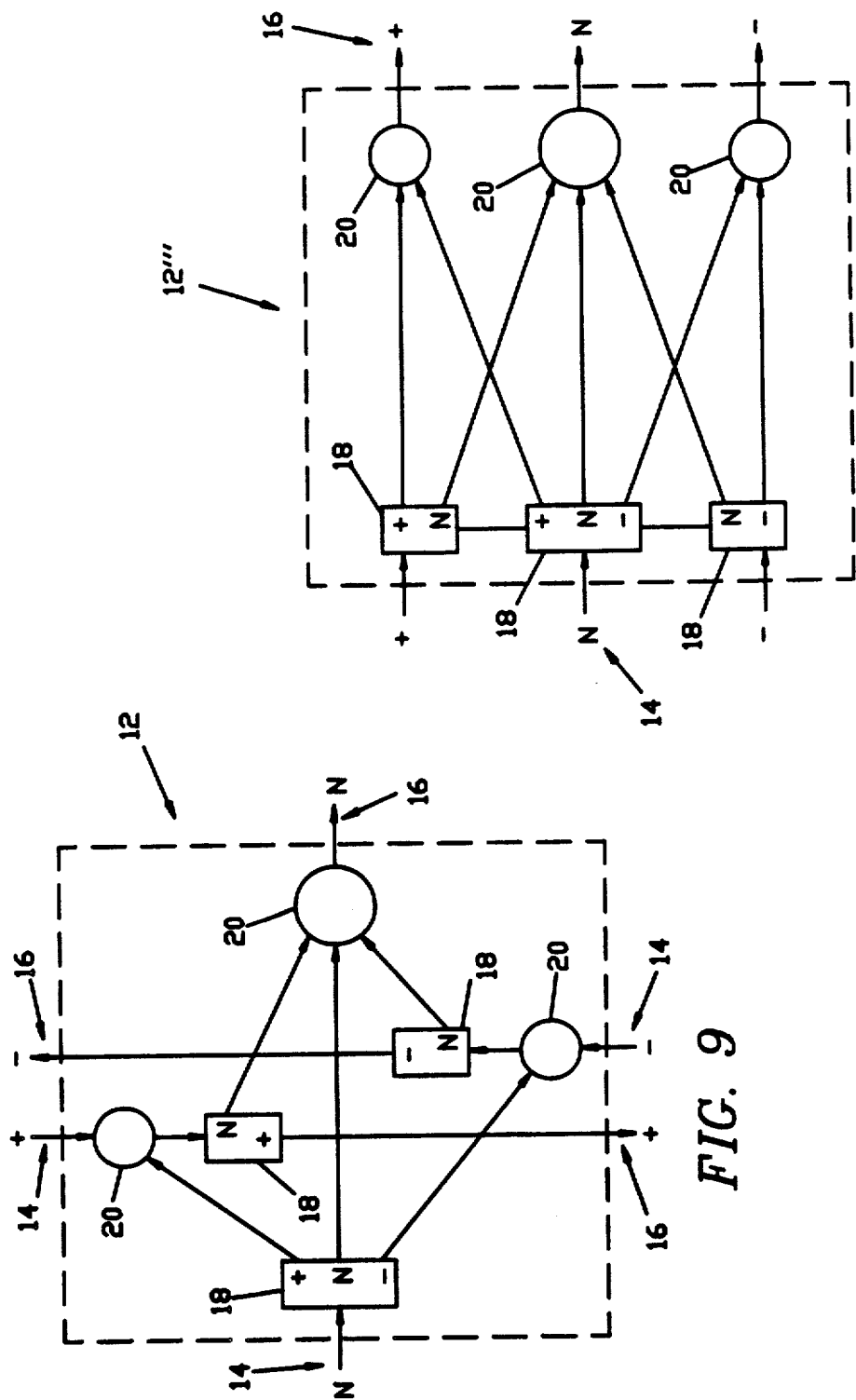

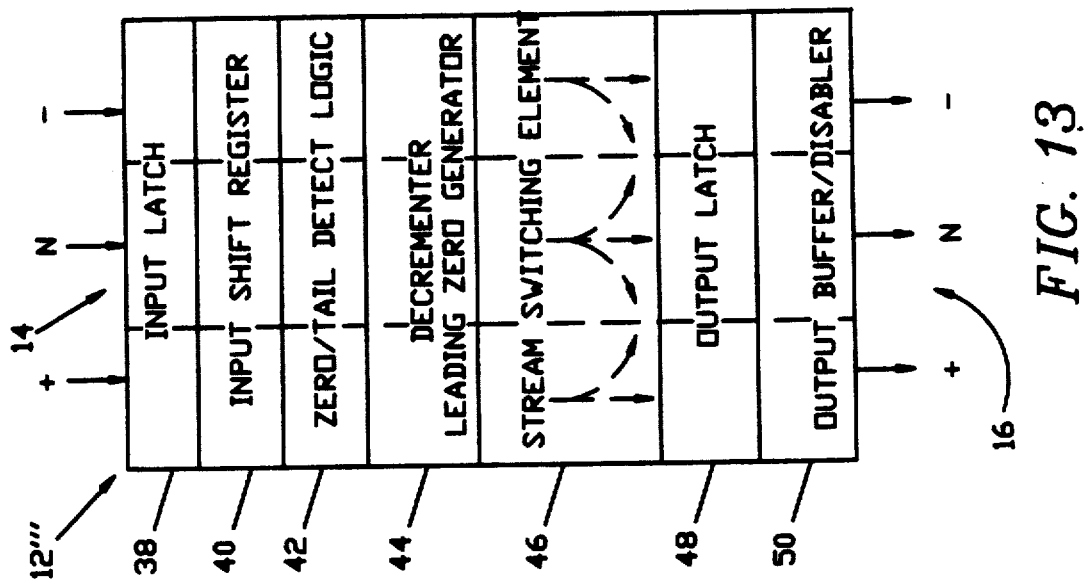
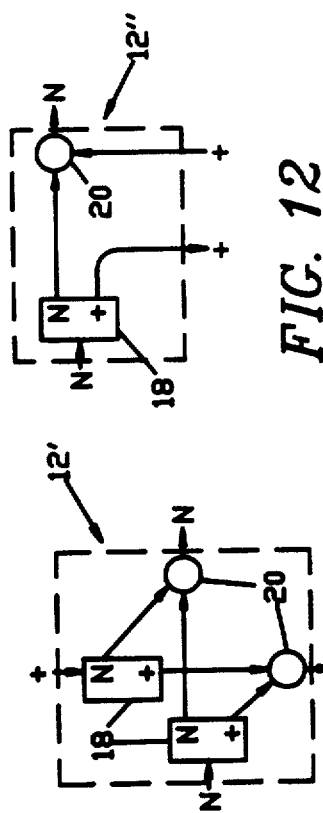
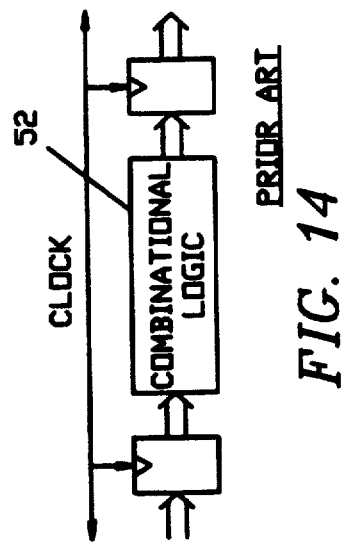

INTER-COMPUTER MESSAGE ROUTING SYSTEM WITH EACH COMPUTER HAVING SEPARATE ROUTING AUTOMATE FOR EACH DIMENSION OF THE NETWORK

ORIGIN OF THE INVENTION

The research described herein was sponsored in part by the Defense Advanced Research Projects Agency, ARPA Order No. 3771, and monitored by the Office of Naval Research under Contract No. N00014-79-C-0597, and in part by grants from Ametek Computer Research Division and from Intel Scientific Computers wherein said entities make no claim to title. It was also done in partial fulfillment of the requirements for the degree of Master of Science of applicant Charles M. Flaig at the California Institute of Technology (Caltech), to whom this application is assigned.

CITED REFERENCES

Dally 86

Dally, William J., "A VLSI Architecture for Concurrent Data Structures," Caltech Computer Science Technical Report 5209:TR:86.

Dally & Seitz 86

Dally, William and Charles L. Seitz, "The Torus Routing Chip," Distributed Computing, Vol. 1, No. 4, pp 187-196, Springer-Verlag, October 1986.

Mead & Conway 80

Mead, Carver A. and Lynn A. Conway, Introduction to VLSI Systems, Chapter 7, Addison-Wesley, 1980.

Seitz 84

Seitz, Charles L., "Concurrent VLSI Architectures," IEEE TC, Vol. C-33, No. 12, pp 1247-1265, December 1984.

Seitz 85

Seitz, Charles L., "The Cosmic Cube," Communications of the ACM, Vol. 28, No. 1, pp 22-23, January 1985.

BACKGROUND OF THE INVENTION

This invention relates to intercomputer message passing systems and apparatus and, more particularly, in an intercomputer routing system wherein message packets are routed along communications paths from one computer to another, to the improvement comprising, a routing automaton disposed at each computer and having an input for receiving a message packet including routing directions as a header thereto and a plurality of outputs for selectively outputting the message packet as a function of the routing directions in the header; and, routing logic means disposed within the routing automaton for reading the header, for directing the message packet to one of the outputs as a function of the routing directions contained in the header, and for updating the header to reflect the passage of the message packet through the routing automata.

For a message-passing, concurrent computer system with very few nodes as depicted in FIG. 1, it is practical to use a full interconnection scheme between the nodes 10 thereof. A full interconnection of channels quickly becomes impractical as the number of nodes increases, since each node of an N node machine must have $N-1$ connections. A configuration used for larger message-passing multicomputers such as the Caltech Cosmic Cube [Seitz 85] and its commercial descendants is that of a binary n-cube (or hypercube) as depicted in FIG. 2 which is used to connect $N = 2^n$ nodes 10. Each node 10 has $n = \log_2 N$ connections, and a message never has to travel through more than n channels to reach its destination.

Although the choice of the binary n-cube for the first generation of multicomputers is easily justified, the analyses presented in a 1986 Caltech PhD thesis by William J. Dally [Dally 86] showed that the use of lower dimension versions of a k-ary n-cube [Seitz 84a] connecting $N = k^n$ nodes, e.g. an $n=2$ (2−D) torus or mesh, is optimal for minimizing message latency under the assumptions of (1) constant wire bi-section and (2) "wormhole" routing [Seitz 84b].

These 2−D (or optionally 3−D) networks also have the advantage that each node has a fixed number of connections to its immediate neighbors, and, if the nodes are also arrayed in two or three dimensions, the projection of the connection plan into the packaging medium has all short wires. Also, the number of nodes in such a machine can be increased at any time with a minimum amount of rewiring. The low dimension k-ary n-cube greatly decreases the number of channels, so that with a fixed amount of wire across the bisection, one may use wider channels of proportionally higher bandwidth. This higher bandwidth, particularly with wormhole routing, can more than compensate for the longer average path a message packet must travel to reach its destination.

The time required for a packet to reach its destination in a synchronous router is given by, $T_n = T_c(pD + [L/W])$; where $T_c$ is the cycle time, p is the number of pipeline stages in each router, D is the number of channels that a packet must traverse to reach its destination, L is the length of the packet, and W is the width of a flow control unit (referred to hereinafter as a "flit").

As an example, let us assume that there are $N = 256$ nodes, 512 wires crossing the bisection for communication (neglecting overhead from synchronization wires), a message length of 20 bytes (i.e. 160 bits), and an internal 2-stage pipeline. The bisection of a binary hypercube has 128 channels in each direction, each with a width of 2 bits, and an average of $(\log_2 N)/2 = 4$ nodes that must be traversed, so that $T_n = (2 \times 4 + 160/2)T_c = 88T_c$. By comparison, the bisection of a 2−D (k×k) mesh, where $k=16$, has 16 channels in each direction, each with a width of 16 bits, and an average of $(2k/3) \sim 11$ nodes must be traversed, so that $T_n = (2 \times 11 + 160/16)T_c = 32T_c$. Thus, the binary hype network in this example has over twice the average latency of a bidirectional mesh network with the same wire bisection.

The Torus Routing Chip (TRC) designed at Caltech in 1985 [Dally & Seitz 86] used unidirectional channels between the nodes 10 connected in a torus as shown in FIG. 3. This is also the subject of a patent application entitled Torus Routing Chip by Charles L. Seitz and William J. Dally, Ser. No. 944,842, Filed Dec. 19, 1986, and assigned to the common assignee of this application, the teachings of which are incorporated herein by reference. As depicted in FIG. 3, the torus is shown folded in its projection onto a common plane in order to keep all channels the same length. Deadlock (a major consideration in multicomputers) was avoided by using the concept of virtual channels, by which a packet injected into a network travels along a spiral of virtual channels, thus avoiding cyclic dependencies and the possibility of deadlock. The TRC was self-timed to avoid the problems associated with delivering a global clock to a large network. There were a total of 5 channels to deal with, i.e., channels to and from the node and 2 virtual channels each in x and y. Thus, the heart of the TRC involved a 5×5 crossbar switch. Although the initial version had a slow critical path, the revised version was expected to operate at 20MHz, with a latency from input to output of 50ns. Since each channel had 8 data lines, the TRC achieved a data rate of 20MB/s. Each packet is made up of a header, consisting of 2 bytes containing the relative x and y address of the destination, any number of non-zero data bytes, and a zero data byte signifying a "tail" or end of the packet. Upon entering the router, each packet has the address in its header decremented and tested for zero and is then passed out through the proper output channel. The connection stays open for the rest of the message and closes after passage of the tail (wormhole routing). If the desired output channel is unavailable, the message is blocked until the channel becomes available.

In the winter and spring of 1986, concurrently with the developments described above, groups of students in the "VLSI Design Laboratory" project course, under the direction of Dr. Charles Seitz of Caltech, were put to work designing different parts of the "Mosaic C" element. This single-chip node of a message-passing multicomputer was to contain a 16-bit central processing unit (CPU), several KBytes of on-chip dynamic random access memory (dRAM), and routing circuitry for communication with other chips. Each chip would form a complete node in a so-called fine-grain concurrent computer.

After looking at a few possible implementations, including the TRC described above, the group working on the routing section decided that a simple, bidirectional 2-D mesh should be used. A mesh had the advantage of keeping the length of wires between chips down to less than one inch, which would allow the use of a synchronous protocol, since clock skew as a function of wire length could be made very small between chips. A mesh would also allow the channels at the edge of the array to be reserved for communications with the outside world. The group also decided to use a bit-serial protocol for packets, both to minimize the number of pins on each chip and to minimize the number of connections needed between them; but, to organize the packets into flits sufficiently large that all of the routing information could be contained in the first flit. As in the TRC, the first Mosaic C router as specified by this group was to use virtual channels to avoid the possibility of deadlock. Each packet consisted of a 20-bit header with the relative x and y addresses of the destination and an arbitrary number of 20-bit flits consisting of a 16-bit data word and 4 control bits. The router also used wormhole routing with one of the control bits signifying a tail. Internally, flits were switched between input and output channels using a time multiplexed bus. The control circuitry was kept as simple as possible, and as a result, did not know how to forward a packet by itself. Each time the header of a packet came in, the CPU would be interrupted (using a dual-context processor for fast interrupt handling) to determine which output channel the packet should be connected to. This approach resulted in a latency of several micro-seconds per step in path formation, but allowed a lot of flexibility in routing under software control. Acknowledgement packets would automatically be sent and received between chips using the same channels to announce the availability of buffers. With a 20MHz system clock (anticipated for 2 micrometer CMOS technology), the bandwidth was expected to be about 2MB/s on each channel. This initial attempt at a routing circuit for incorporation into the Mosaic C chip was never reduced to a layout. After due consideration, it became obvious that it would consume a large amount of silicon area (on the chip) only to achieve fairly dismal performance.

Wherefore, it is an object of the present invention to provide a new method for routing message packets in a message-passing, multicomputer system which will allow the routing processor to provide good performance with a minimum amount of silicon area on the chip consumed thereby.

It is a further object of the present invention to provide a new element for use in a routing processor for routing message packets in a message-passing, multicomputer system.

It is still another object of the present invention to provide a multifunction node chip for use in fine grain message-passing, multicomputer systems incorporating a router for routing message packets in a manner to provide good performance with a minimum amount of silicon area on the chip consumed thereby.

Other objects and benefits of the present invention will become apparent from the detailed description which follows hereinafter when taken in conjunction with the drawing figures which accompany it.

SUMMARY OF THE INVENTION

The foregoing objects have been achieved in a fine-grain, message-passing, multicomputer, concurrent computing system wherein there are a plurality of computing nodes each including bus means for interconnecting the components of the chip; read only memory (ROM) operably connected to the bus means; random access memory (RAM) operably connected to the bus means; central processing unit (CPU) means operably connected to the bus means for executing instructions contained in the ROM and RAM; and packet interface (PI) means operably connected to the bus means for encoding headers on message packets being transmitted by the CPU means of one chip to another chip and for transferring the message packets to and from the RAM, by the improved method of routing the message packets between the nodes comprising the steps of, providing a routing automaton at each node and interconnecting the routing automata to define communications paths interconnecting the nodes along which the message packets can be routed; and at each routing automaton, receiving a message packet including routing directions comprising the header at an input thereof; reading the header; directing the message packet to one of two outputs thereof as a function of the routing directions contained in the header; and, updating the header to reflect the passage of the message packet through the routing automaton.

The preferred method additionally comprises the steps of, providing a packet interface; and at each packet interface, receiving a message packet to be transmitted to a destination node from the RAM; adding routing directions as a header to the beginning of the message packet; and, transmitting the message packet to the routing automaton of the next adjacent node on the route to the destination node. Additionally in the preferred method, at each packet interface there are the steps of, receiving a message packet at a destination node; stripping remaining portions of the header from the message packet; storing the message packet in the RAM; and, informing the CPU that the message packet is in the RAM.

The preferred method at each packet interface also comprises the additional step of, storing a memory map of the locations of the other nodes in the system and a corresponding route to each node; wherein the step of adding routing directions as a header to the beginning of the message packet comprises, receiving a destination node designator from the CPU requesting the transmission of the message packet; retrieving the route to the destination node from the memory map; and, adding the route to the destination node to the beginning of the message packet as part of a header.

DESCRIPTION OF THE DRAWINGS:

FIG. 1 is a simplified drawing depicting a prior art computer system wherein each node is connected directly to every other node.

FIG. 2 is a simplified drawing depicting the node interconnection scheme employed in a so-called hypercube according to the prior art.

FIG. 3 is a simplified drawing depicting a prior art torus routing chip interconnection scheme.

FIG. 4 is a simplified drawing of a single, one dimensional routing automaton according to the present invention.

FIG. 5 is a simplified drawing showing three routing automata of FIG. 4 connected in series to control packet movement in three dimensions.

FIG. 6 is a simplified functional block diagram of a fine-grain computer chip according to the present invention.

FIG. 7 is a drawing of an exemplary data stream as it passes through a series of nodes according to the method of packet routing of the present invention.

FIG. 8 is a simplified drawing to be employed with FIG. 7 to follow the example of FIG. 7.

FIG. 9 is a simplified block diagram of the internal structure of a routing automaton according to the present invention in one possible embodiment thereof.

FIG. 10 is a simplified block diagram of the internal structure of a routing automata according to the present invention in a preferred and tested embodiment thereof.

FIG. 11 is a simplified block diagram of the internal structure of a routing automaton according to the present invention in an embodiment thereof intended for use in a torus routing chip system of the type shown in FIG. 3.

FIG. 12 is a simplified block diagram of the internal structure of a routing automata according to the present invention in an embodiment thereof intended for use in a hypercube as shown in FIG. 2.

FIG. 13 is a drawing corresponding to the embodiment of FIG. 10 and depicting the elements thereof in their connected sequence as incorporated into a chip as laid out, built and tested by the applicant herein.

FIG. 14 is a functional block diagram depicting a stage of a synchronous pipeline system as is known in the art.

DESCRIPTION OF THE PREFERRED EMBODIMENT

Figure 16:
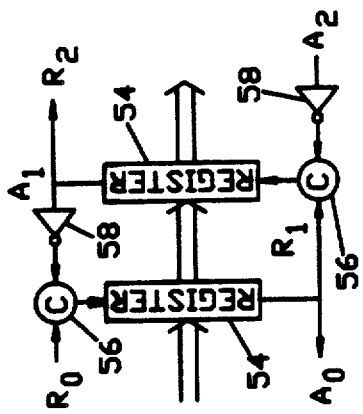
FIG. 16 is a functional block diagram of a FIFO stage as employed in the asynchronous approach to the present invention.

The present invention is based on two major deviations from the prior art. The first was the rejection of employing the x and y addresses of the destination of a packet in the header in favor of a prefix encoding scheme which would allow the packet header to encode the relative address of the destination in the form of a path "map" on several small successive flits. This approach was the key to getting around the problem of having to see a large amount of header information before any logic could decide where to send the head of the packet. This change also simplified the required routing logic circuitry enough to allow it to handle forwarding automatically on a local basis without having to disturb the CPU. The novel deadlock-free routing method decided upon (a design criteria "must") was to send packets on a fixed route on a mesh of first x, and then y, instead of employing virtual channels to avoid deadlock. Initial designs involved 5-bit flits (4 data, 1 control, with an acknowledge wire in the reverse direction) to be sent in parallel on each channel, and to be internally switched using a crossbar switch.

The second major deviation from the prior art was the early rejection of the crossbar switch in favor of a new formulation which has been designated as "routing automata". It was realized early on that a crossbar switch, while very general, had the disadvantage of taking up space (on the chip) proportional to $(nW)^2$, where n is the number of inputs and outputs, and W is the number of bits being switched. With a fixed routing scheme being employed, the generality of a crossbar switch was not needed and it was highly desirable to devise a scheme in which the area consumed would only increase linearly with nW, or as close as possible thereto. This scaling would make it easier to modify the router for more dimensions or wider flits without involving major layout changes, would decrease the path length in the switch and hence its speed, and would, hopefully, decrease the overall area for designs with wide flits and a large number of dimensions.

As depicted in FIG. 4, each of the automata 12 is responsible for switching the packet streams for one dimension of the overall router. An automaton's input, generally indicated as 14, consists of streams from the + and − directions as well as from the previous dimension. Its output, generally indicated as 16, consists of streams to the + and − directions as well as to the next dimension. For n dimensions, n of the automata 12 are strung together in series as depicted in FIG. 5; and, if properly constructed, their size, i.e. the area consumed on the chip, increases roughly linearly with increased width of the flits, for a net increase in area proportional to nW, as desired. Both synchronous and asynchronous (i.e. self-timed) versions of automata according to the present invention will be described shortly. The self-timed version is intended to have each of its components highly modular so that they could be used not only to implement mesh routing, as in the Mosaic C chip, but could also be fit together to implement unidirectional routers, routers for hypercubes, or many other structures, limited only by the desires of the designer. The basic components include a FIFO for "glue" between stages and buffering, a switch used both to divide and merge data streams, a decrementer for adjusting the relative address of the destination as the packet passes through, and control structures for all of the foregoing. Before continuing with specifics of the automata, however, the novel prefix encoding scheme of the present invention as employed therein will be addressed first in further detail.

The prefix encoding scheme of the present invention allows packets to travel through a sequence of nodes at a constant rate, with the first flit of the header generally containing enough information to determine the output channel at each node. The scheme involves the use of a "leading zero" flit that can be used to limit how much of the relative address needs to be looked at before a decision can be made or the address decremented. As mentioned earlier, the header acts as a "map" on a node-by-node basis rather than as a final destination address as in the prior art; that is, as a packet passes through each automaton 12 the only decision that must be made is, like following a map at a highway intersection, "Am I there?" and, if not, "Do I turn or go straight?" The example depicted in FIGS. 7 and 8 may help to clarify the method of the present invention. In the example, there is a 3-bit flit employed (2 data, 1 control), which is the minimum width that allows encoding of the necessary "alphabet" of symbols—which are +, −, ., T, 0, 1, 2 and 3. Where data elements 0, 1, 2, 3 of the alphabet need not be distinguished in an example, they are shown by the letter "M". Each line of FIG. 7 represents the packet as it leaves the node listed to the left and as depicted in FIG. 8, with "SOURCE" designating the node 10 sending the packet and "DESTINATION" indicating the node 10 intended to receive the packet. Time is from the top down in FIG. 7, as indicated. Note that as header flits are no longer needed as part of the "map", they are stripped off.

In the example, the message TMMMM.3+12+ consists of the header (.3+12+), the "payload" (MMMM), which could be of any length, and the tail flit (T). When this message is injected by the SOURCE node 10, the route to the DESTINATION node 10 is to go six nodes in the + direction from the SOURCE node 10 (i.e. 12 radix 4 = 1(4)+2(1) = 6) and then three nodes in the + direction from NODE 6. Originally, the packet enters the network and takes the + direction in the first (i.e. x) dimension. The + flit is stripped off and the new leading flit (i.e. 2) is decremented while passing through each node until it reaches 0. During the decrement to 0 (in this example in NODE 2), the following flit is examined to see if it is a digit. In this case it is, so the leading flit becomes 0. In NODE 3, the second flit needs to be decremented to 0; but, since it is not followed by a digit, it becomes a "leading zero", indicated by the "." designator. The leading flit becomes a 3 (representing the 4 additional nodes to proceed in the same direction) and the leading zero indicator is placed in the following flit. In NODE 6, the leading flit is once again in the position of decrementing to 0. This time, however, the next flit is the leading zero designator. As a consequence, the third flit is used to switch the path of the packet to the + direction in the second (i.e. y) dimension from NODE 6. As with the initial + indicator, the + indicator and two leading zero (i.e. "..") flits are stripped from the header. The same process is continued until the relative address of the header is decremented to 0 once again. At this point, the packet has run out of dimensions to traverse, so it is passed into the receiving (i.e. DESTINATION) node 10. The tail (T) which makes up the end of the packet closes all of the channel connections as it passes through the nodes 10, and is finally stripped off at the DESTINATION node 10 along with the remaining header flits to leave only the data flits as indicated in FIG. 7. As can be appreciated from this example, the encoding scheme of the present invention allows the use of small flits to represent large offsets (compared with prior art x,y final address designations) while allowing decisions to be made based on only two flits of the header at once, which helps minimize the latency of forwarding through each node. The simple decision involved also allow a simple control logic to be employed.

Turning once again to the routing automata of the present invention, as previously mentioned, the reduction of the routing circuitry to simple automata that control the switching through only one dimension greatly simplifies the modification and expansion of a complete router. An individual automaton is also much easier to design and lay out due to the reduced number of inputs and outputs, and independence from the routing occurring in other dimension. As pointed out above, the basic one dimensional (1−D) automaton 12 of FIG. 4 has three inputs 14 for the receipt of packets travelling, respectively, (1) in the + direction, (2) in the − direction and (3) from the previous dimension. Simple finite state machines can then process the input streams, decide on a switch configuration that allows the largest number of packets to be forwarded, and then connect the streams (1) to the + direction, (2) to the − direction and (3) to the next dimension at the outputs 16.

The 1-D automata 12, which have three inputs and three outputs, and which are composed to make 2-D or 3-D automata, can themselves be composed of simpler automata. In the limit, the routing automata must include, at minimum, a decision element with one input stream and two output streams and a merge element with two input streams and one output stream. Other automata with one input stream and one output stream can be employed to take care of decrementing and/or stripping the header in the manner described herein.

The example depicted in FIG. 9 illustrates one possible configuration. The boxes in FIG. 9 represent decision elements 18 that process their incoming data streams and switch them onto their proper output stream. The circles represent merge elements 20 that take their input streams and arbitrate which of them to connect to their output stream; that is, the merge elements 20 include logic to avoid collisions between two streams being merged. Thus, a packet coming from the previous dimension that is to exit in the + direction would enter the leftmost decision element 18 (as the figure is viewed), be switched onto its upper output stream, and merge into the stream exiting in the + direction.

Breaking down the internal structure of the automata in this way can further simplify the design and layout, in the same manner as breaking up the router into a series of 1-D automata. Even when parts cannot be directly reused, time can often be saved by employing modification rather than a complete redesign. In the extreme case, each of the decision and merge operations can be converted into binary form, where 3-way elements are replaced by cascaded binary elements. In this case, the elements become very homogeneous and the automata can be formed out of a minimal subset of very simple elements. This approach is the one used in the self-timed routing automata to be discussed in detailed later herein. These automata can also be constructed for different channel configurations using the same set of internal elements. For example, they can be constructed for unidirectional channels as used in a torus or a hypercube. Examples of the internal structure of such automata are shown in FIGS. 11 and 12 where FIG. 11 depicts a unidirectional automata 12' for use in a torus routing scheme and FIG. 12 depicts a hypercube routing automata 12".

The invention of the routing automata and its associated method of operation in routing packets provided the opportunity of constructing a novel chip for the Mosaic C application as well; that is, the present invention includes a novel chip for containing each node in a fine-grain, message-passing, multicomputer, concurrent computing system wherein a plurality of computing nodes are each contained on a single chip. This "Mosaic chip" 22 is shown in functional block diagram form in FIG. 6. The Mosaic chip 22 is a complete node for a fine-grain concurrent computer. It contains all of the necessary elements including a 16-bit CPU 24 several KBytes of ROM 26 and dRAM 28, as well as routing circuitry comprising a packet interface (PI) 30 and router 32 for communicating with neighboring nodes in a mesh. All of these elements are tied to a common bus 36. Since the router had to fit on a chip along with a processor and memory, the design had to be simple and compact—the automata-based routing scheme of the present invention as described hereinbefore provided such a capability. The PI 30 takes care of encoding the packet header and transferring packet data to and from memory. A simple cycle-stealing form of Direct Memory Access (DMA) is preferred to keep up with the high data rates supported by the router. In the preferred embodiment, the PI 30 also contains some memory mapped locations that are used to specify the relative x and y addresses of the destination node, and an interrupt control register.

The PI 30 generates the appropriate direction control flits and multiplexes the relative x and y addresses in its registers into the flit width required by the router 32. It does the same multiplexing for the packet's data words, which come from an output queue in the dRAM 28. A tail flit is added when the output queue becomes empty. These flits are injected into the previous dimension input of the automaton for the first dimension. Any packets coming out of the last dimension simply have their tail stripped off and the flits are demultiplexed into a 16-bit word, which is then stored in an input queue in the dRAM 28. The CPU 24 may be interrupted either when the output queue becomes empty, when a tail is received, or when the input queue becomes full.

As will be described in greater detail hereinafter, the Mosaic router 34 communicates with other nodes using a 3-bit wide flit (2 data, 1 control) with an acknowledge wire in the reverse direction to control movement between stages of the preferred pipelined design and prevent overwriting from one stage to the next. Any time an acknowledge is present, flits are allowed to progress through the pipeline. The flit can also be made wider to include more data bits. As presently contemplated, the first "production" Mosaic chip will employ a 5-bit flit.

As a result of the bit-slice design employed in a tested embodiment, it became more efficient in the data path to combine the decision and merge operations in a slightly different manner than in the sample automaton 12 shown in FIG. 9. The actual preferred configuration is shown in FIG. 10. In this tested configuration, generally designated as 12'''. the decision and merge operations were lumped together into one switch matrix, which handles both the multiplexing and demultiplexing of the data streams, with 4 minimally encoded control wires and their complements selecting one of the possible switch configurations. Although the combined switch approach may possibly minimize the overall size of the router by homogenizing the data path layout for the different channels, it also complicated the control circuitry. Thus, while it may have been the best approach for a 1-bit slice path, those implementing the present invention for wide data path slices may find that it is not a good approach for such applications.

In an attempt to minimize the overhead of extending the width of a flit, the Mosaic router as built and tested employed an approach of constructing the data path out of 1-bit wide slices, with the +, −, and N paths for each bit being placed immediately next to one another. This preferred approach allows the same switching elements to be used no matter how wide the flit is. On the negative side, it also means that the control signals for all three data paths had to be propagated through all of the elements, and this led to a somewhat larger overhead in wiring than is necessary. It also complicated the layout of the control circuitry since it had to fit in an effectively smaller pitch. The data path is made up of a number of elements as shown in FIG. 13 (which corresponds to the embodiment of FIG. 10 as actually laid out and implemented on a chip). Each element, of course, comprises three portions (for the +, − and N paths) as indicated by the dashed lines dividing them. When connected sequentially in the order shown, these elements form a complete data path for a Mosaic routing automaton. The inputs are to an input latch 38 followed by an input shift register 40 as required to properly interface with the preceding stage. This is followed by the zero and tail detection logic 42. Next follows the decrementer and leading zero generator logic 44. The stream switching element 46 follows next. As indicated by the dashed arrows, the stream switching element portions operate in the same manner as the three decision elements 18 of FIG. 10; that is, the two outer switching element portions switch between straight ahead and towards the center path while the center switching element portion can switch between straight ahead and either of the two outer paths. The properly switched packet paths from the stream switching element 46 then proceeds to an output latch 48 and an output buffer/disabler 50 as required to properly interface the asynchronous automata to the next node without destructive interference, as described earlier herein.

Turning briefly to the packet interface (PI) 32 mentioned earlier herein, using the minimum sized flit data width of 2 bits and the Mosaic word size of 16 bits, the inventors herein found that the router of the present invention can deliver one word every 8 cycles. The data rate becomes even faster if wider flits are used. There is no way that the CPU 24 can keep up with this data rate under software control. Therefore, it was decided that in the preferred approach a simple form of cycle-stealing DMA (as is known in the art) should be used to transfer packets between the router 34 and memory, i.e. dRAM 28. For this purpose, four extra registers were added to the CPU 24 to be used as address pointers and limit registers for the input and output channels. Each time the storage bus is not being used by the CPU 24 (about once every 3 or 4 cycles for typical code) the microcode PLA emits a bus release signal. A simple finite state machine then arbitrates between bus requests from a refresh counter, the input channel, and the output channel, and grants the bus cycle to one of them. If a channel is given the cycle, it pulls on a line which causes the corresponding address pointer in the CPU 24 to be placed on the address bus, and the channel then reads or writes data from that location in the dRAM 28. The address pointer is then incremented and compared with its limit register. If the two are equal, the DMA logic is disabled and the CPU 24 is interrupted to process the I/O queues. If an interrupt occurs when an output packet word is requested, a tail is sent following that packet.

A packet is sent by setting the output address pointer to the starting location of the desired data in the dRAM 28 and setting the limit register to the location of the end of that data. The CPU 24 then writes the relative address of the destination node of the packet to memory mapped locations in the channel (using the sign and magnitude form described above). When the last location is written, the header is encoded and sent, with the data following. Data is best received by setting the input channel pointer to the starting location of a queue and setting the limit register to the end of the queue. The CPU 24 can then examine the value of the address pointer at any time to see how many words are in the queue. Currently, there is no provision for marking a tail, so if explicit knowledge of the length of a data packet is required, one of two methods must be use—(1) the length of the packet can be encoded in the first word of the packet, which the CPU 24 can then examine, or (2) the CPU 24 can be interrupted when the tail of a packet arrives so that the interrupt routine can examine the input address pointer register to determine the length of the packet.

Much of what was learned from the design of the Mosaic synchronous router can be applied to an asynchronous routing automaton. An asynchronous router can be used in physically larger systems, such as second-generation multicomputers, in which the interconnections are not limited to being very short wires. The mesh routing chip (MRC) now to be described is designed to meet the specifications for these second-generation multicomputers. These routing automata are intended to be a separate chip, similar to the Torus Routing Chip mentioned earlier herein, as opposed to being part of an integrated "total node" chip such as the Mosaic chip described above. As in the Mosaic router, the 2-D MRC has 5 bidirectional channels, with channels in the $+x$, $-x$, $+y$, $-y$ directions and a channel connecting it to the packet interface. Data is represented on each of the channels using 9-bit wide flits (1 tail, 8 data), where the first bit is the tail bit.

For a 2-D router, the first two flits form the header. In each header flit, a relative offset of six bits allows for up to sixty four nodes along a single dimension, which should be sufficient for any second generation machine with large nodes. The seventh data bit in a header flit is reserved for the future addition of broadcast support and the eighth bit is the sign. A 9-bit flit together with the asynchronous request and acknowledge signals for each channel requires a total of eleven pins. Five directional channels ($+x$, $-x$, $+y$, $-y$, and the node) then require 110 pins, and the constructed version of the chip was placed in a 132 pin PGA package. The remaining pins are used for a reset and for multiple Vdd and GND pins to minimize noise.

Pipelining is well known in the art and used in many synchronous systems to increase their throughput, [Seitz 84]. Each cycle, each stage of the pipeline accepts data from the previous stage, performs some relatively simple operation on the data, and passes the resulting data on to the next stage. Data is passed between stages during each cycle by clocked registers. A typical synchronous pipeline section is depicted in FIG. 14. The combinational logic in each stage has one clock period in which to produce valid output data based on its input data. This time, $T_c$, is the same for all stages in the pipeline, and the time required for data to flow through the pipeline is $T_n = T_c p$, where p is the number of stages in the pipeline.

Figure 15:
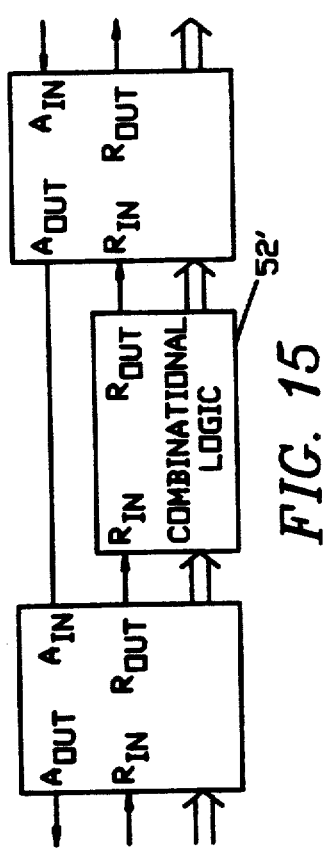
FIG. 15 is a functional block diagram depicting a stage of an asynchronous pipelined approach to the present invention.

A similar arrangement can be used in an asynchronous system. Instead of a global clock, the 4-cycle request and acknowledge signals [Mead & Conway 80] are used to control data flow between stages, as shown in FIG. 15. In an asynchronous pipeline, each stage processes data at its own rate, and passes its output data to the next stage when it is finished. Each stage, therefore, has its own cycle time, $t_c$, which is the time it requires to complete its request and acknowledge 4-cycle. Each stage also has a characteristic fallthrough time, $t_f$, which is the time required from when an input request is received until the data is processed and an output request is generated. The ratio of $t_c/t_f$ determines across how many stages a cycle (and an item of data being worked on) extends. By necessity, $t_f < t_c$ and for most practical designs $t_c \approx 2 t_f$.

Looking back at the three dimensional automata series shown in FIG. 5, it can be seen that data flows in only one direction within each automaton 12, and the different paths are independent (except for merge operations). Thus, it is an easy transition to think of routing automata as being implemented using a pipeline structure, as in the MRC. As established earlier here, the transit time, from source to destination, of an unblocked packet in the synchronous case is given by, $T_n = T_c(pD + L/W)$. For the asynchronous case, some of these terms are changed because the head of a packet advances at the fallthrough rate, which is less than the cycle time. The formula for network latency of the asynchronous case can be expressed as, $T_n = T_f D + T_c[L/W]$; where $T_f$ is the fallthrough time for a node. For relatively short packets, D is comparable to L/W, so there is no strong motivation to reduce either $T_f$ or $T_c$ at the expense of the other. $T_f$ and $T_c$ can be expressed as, $T_c \approx 2 t_p + t_c$ and $T_f \approx t_p + t_f p$; where, $t_p$ is the time required to drive the pads, p is the number of stages in the internal pipeline, and $t_f$ and $t_c$ are the average fallthrough and cycle times, respectively, for a single stage of the pipeline, as described above. A pad, and the external components connected to it, are relatively difficult for a VLSI chip to drive, so $t_p >> t_c > t_f$. This means that the number of stages in an asynchronous pipeline can be increased without significantly increasing the overall delay. In the case of the MRC, increased pipelining has a significant advantage in that having more pipeline stages provides the network with more internal storage for packets, and consequently, helps prevent congestion of the network.

The preferred asynchronous FIFO structure employed in the present invention is based on chained Muller C-elements [Mead & Conway 80]. Its basic structure is shown in FIG. 16. Care must be taken to insure that the register cells 54 controlled by the C-elements 56 are fully turned on or off before request and acknowledge signals are generated and that they are fast enough to latch the data before the load line changes state again. The first requirement can be taken care of by introducing sufficient delay in the request and acknowledge lines, or, more safely, by using a Schmitt trigger (a gate with hysteresis on each input as is known in the art) to detect the state of the load control line.

Initially, all of the C-elements 56 are reset to 0. Data is presented on the inputs, and the request line ($R_0$) is pulled high. This causes the output of the first C-element 56 to be pulled high, causing the data to be latched. When this load control line becomes high, the data is assumed to be latched, a request ($R_1$) is passed to the next stage, and the acknowledge line ($A_0$) to the previous stage is pulled high. When the next stage latches the data and an acknowledge ($A_1$) is received from it and the request line ($R_0$) goes low, the FIFO state is reset to its initial condition. In this manner, the data quickly falls through the chain of FIFOs, with the data always spread across at least two stages. If the request time is significantly less than the acknowledgment time, then the flit will be spread across more than two stages while it is falling through the pipeline.

The second requirement of fast latches is usually easy to meet, since latches are generally much faster than C-elements (and Schmitt triggers). The registers 54 used in these FIFOs consist of a closed loop of a strong and weak inverter 58, with the data gated to the input node of the stronger inverter 58 as is known in the art. Thus, the data is inverted at each stage of the FIFO, and these stages should be used in multiples of two to preserve the sense of the data. In order to save space in the tested embodiment, the register cells 54 are flip-composed vertically, for data path widths that are multiples of 2. In the MRC, the path width is 10 bits, so there is an extra bit available for propagating information between stages of the pipeline, if it becomes desirable to do so. For 1.2 micrometer CMOS, it is expected, from model calculations, that each FIFO should have a $t_f$ (i.e. fall-through time) of about 1 ns. This follows the assumption of $t_f < t_p$ (pad driving time), which is about 5 ns (more with a large load or long connection line), so that extra stages of pipelining do not add significantly to the latency of a packet passing through a node.

Figure 17:
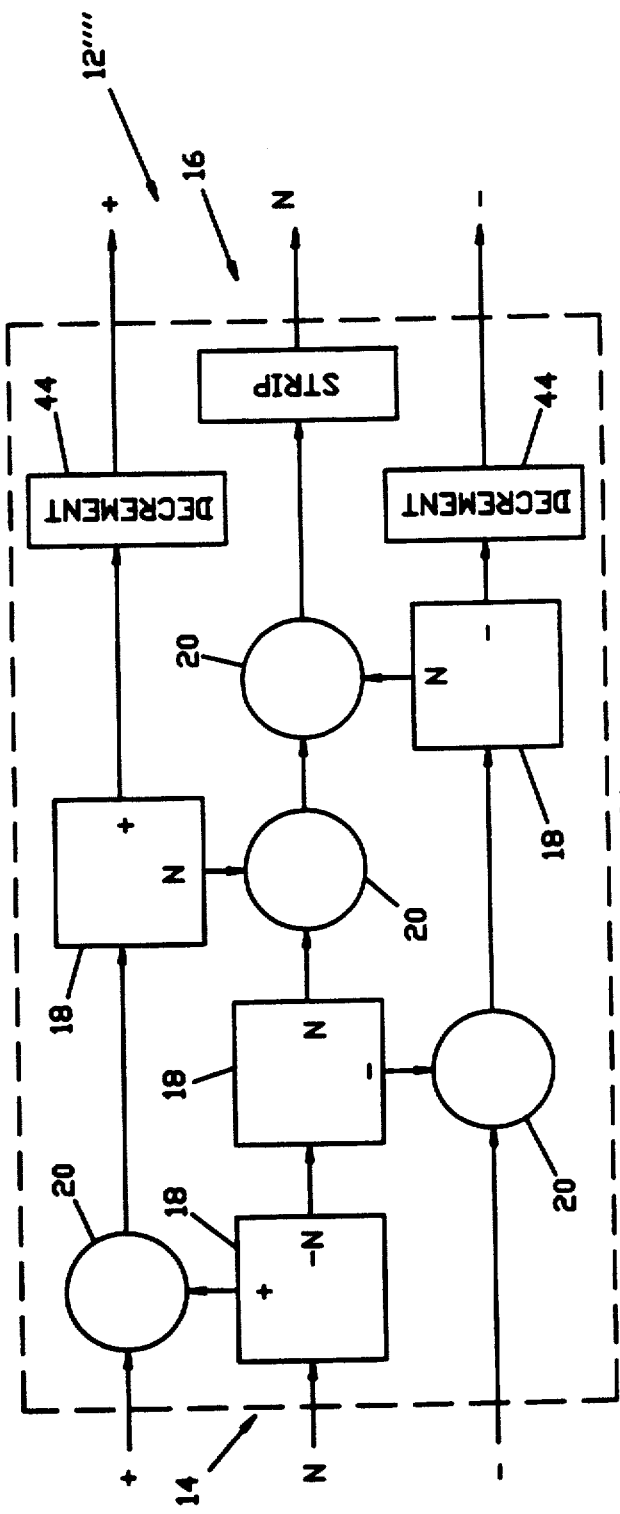
FIG. 17 is a functional block diagram of the asynchronous routing automaton of the present invention in its built and tested embodiment employing binary switching logic.

For simplicity and easy modularity, binary decision and merge elements were used in the asynchronous automata as built and tested by the applicant herein. With careful design, it was possible to use basically the same switch for both elements, simply by flipping it sideways. Each section of the switch consists of a simple 1-to-2 multiplexer (or 2-to-1 demultiplexer), and enough of these are connected along a diagonal to handle the width of a flit. Because of the use of binary switches, the internal construction of the tested asynchronous automata 12'''' is as shown in FIG. 17. The decrementers 60 are a simple asynchronous ripple borrow type, with a line that is pulled low to indicate completion. Completion is defined by a stage that receives a borrow in, and produces no borrow out because of having a 1 on its data input. This completion signal is used to generate the request signal for the next stage in the pipeline. As with the registers 54 in the FIFO, it is assumed that the forward propagation through the decrementers 60 is less than the cycle time of a C-element and Schmitt trigger combination.

Finally, it should be noted that, internally, the automata of the present invention use 4-cycle signaling for flow control; but, to increase speed and conserve power, signals sent off chip must use a 2-cycle convention. A small amount of conversion must be done, therefore, before driving the pads. This conversion also adds a small amount of delay in the request/acknowledge path, which helps ensure that the data is valid by the time a request is received, even if the delays in the lines are slightly skewed. If the delays are skewed by a large amount, a simple lumped RC delay can be added to the request line external to the chip.

It is worthy of note to report that the first Asynchronous MRC chips were suubmitted in September 1987 for prototype fabrication in a 3 micrometer CMOS process. The fabricated and packaged chips were returned in November 1987. They functioned correctly at a speed of approximately 10 Mflits/s. Production chips fabricated later in a 1.6 micrometer CMOS process operated at about 30 Mflits/s, about three times faster. Subsequent design refinements in layout and implementation have increased the potential speed of the MRC to 48 Mflits/s in 3 micrometer CMOS. This speed obtained by a prototype of FIFO and 2/4 cycle conversion circuitry submitted for fabrication in February 1988 and returned and tested in April 1988. In a 1.6 micrometer CMOS process, these designs are anticipated to operate at approximately 100 Mflits/s. The primary limitation at these speeds is the lead inductance of PGA packages. Improved packaging techniques should allow such chips to operate at 150 Mflits/s.

Wherefore, having thus described the present invention, what is claimed is:

1. An inter-computer message routing system wherein message packets are routed among a plurality of computers along communication paths between said computers in an n-dimensional network of said communication paths, different groups of said communication paths comprising different ones of the n dimensions of said network, said message packets each comprising a header containing successive routing directions relative to successive computers along a selected route in said network, said system comprising:

a plurality of routers, each router being associated with a corresponding one of said computers, each of said routers comprising n routing automata corresponding to said n dimensions, each of said n routing automata having plural message packet inputs and plural message packet outputs, at least some of said inputs and outputs being connected to respective communication paths of the corresponding one of said n dimensions, said n routing automata being connected together in cascade from a message packet output of one to a message packet input of the next one of said routing automata corresponding to a sequence of dimensions of the routing automata;

routing logic means disposed within each one of said routing automata, said routing logic means comprising means for reading the header of a message packet received from one of the inputs of said one routing automata, means for directing said message packet to one of said outputs of said one routing automata in accordance with the contents of said header, and means for modifying said header to reflect the passage of said message packet through said one routing automata, whereby each of said routing automata performs all message routing for the message packets traveling in a corresponding one of said dimensions.

2. The system of claim 1 wherein said means for directing said message packet to one of said outputs comprises plural decision element means each having one decision input and plural decision outputs for directing a message packet received at said decision input to one of said decision outputs in accordance with the contents of said header, and plural merge element means having plural merge inputs and a single merge output for directing message packets received at the plural merge inputs thereof to said merge output without interference between said message packets.

3. The system of claim 2 wherein within a single one of each routing automata at least some of said decision inputs are connected to respective message packet inputs, at least some of said merge inputs are connected to respective decision outputs and at least some of said merge outputs are connected to respective message packet outputs.

4. The system of claim 1 wherein said header comprises a sequence of symbols and said means for modifying said header comprises:
means for decrementing a leading symbol in said header whereby said header specifies a direction for said message packet relative to a next one of the computers along said selected path.

5. The system of claim 4 wherein said means for modifying said header further comprises means for stripping no longer needed portions of said header.

6. The system of claim 4 wherein said sequence of symbols include symbols each comprising a count decrementable by said means for modifying said header, said count specifying a duration of travel in a constant dimension.

7. The system of claim 6 wherein said system permits bi-directional travel in each one of said dimensions, said sequence of symbols further including binary directional symbols specifying one of two directions.

8. The system of claim 6 wherein said means for modifying said header comprises means for decrementing a leading non-zero one of said counts and wherein said header specifies a change to the next one of said sequence of dimensions upon two consecutive leading counts thereof preceding one of said binary directional symbols being decremented to zero.

9. The system of claim 8 wherein said means for directing said message packet comprises means responsive to said header specifying a change o the next one of said sequence of dimensions for directing said message packet to a message packet output connected in cascade to a message packet input of a next routing automata of said next dimension.

10. The system of claim 3 wherein:
travel by said message packets along said paths is mono-directional and said system is one of a group of networks comprising 2-dimensional mesh networks and 3 dimensional torus networks;
there are two message packet inputs in each routing autotmata comprising one message packet input which receives message packets traveling in the corresponding dimension and another message packet input connectable to a message packet output of a preceding routing automata connected in cascade therewith; and
there are two message packet outputs in each routing automata comprising one message packet output which transmits message packets for travel in said corresponding dimension and another message packet output connectable to a message packet input of a succeeding routing automata in cascade therewith.

11. The system of claim 10 wherein:
there are two decision element means and two merge element means in each of said routing automata;
each of said decision element means has two decision outputs and each merge element means has two merge inputs.

12. The system of claim 3 wherein:
travel by said message packets along said paths is bi-directional;
there are three message packet inputs in each routing autotmata comprising first and second message packet inputs which receive message packets traveling in first and second directions in the corresponding dimension respectively, and a third message packet input connectable to a message packet output of a preceding routing automata connected in cascade therewith; and
there are three message packet outputs in each routing automata comprising first and second message packet outputs which transmit message packets for travel in first and second directions in said corresponding dimension respectively, and a third message packet output connectable to the third message packet input of a succeeding routing automata in cascade therewith.

13. The system of claim 12 wherein:
there are at least three decision element means and three merge element means in each of said routing automata;
at least one of said decision element means has three decision inputs including first and second decision inputs corresponding to said first and second directions and a third input corresponding to said preceding dimension;
at least one of said merge element means has three merge inputs of which at least one is connected to one of the three decision outputs of said one decision element means having three decision outputs.

14. The system of claim 1 wherein each of said computers comprise an integrated circuit including the corresponding router, a processor, a memory, a packet interface connected to said router and a bus connecting said packet interface, said memory and said processor, wherein:
said processor comprises means for retrieving information data from said memory to be routed in said network in a message packet and for computing an initial header based upon destination instructions stored in said memory; and
said packet interface comprises means for forming a data stream comprising said information data and said initial header and transmitting said data stream to said router connected thereto as a message packet.

15. The system of claim 4 wherein:
said metwork is one-dimensional and comprises an asynchronous pipeline of succesive ones of said computers in which said routers are connected in a cascaded succession of routers each comprising one routing automata; and said means for decrementing comprises means for providing an asynchronous request signal to a successive one of said routing automata.

16. The system of claim 2 wherein said plural decision element means are a first set of substantially identical building block elements, said plural merge element means are a second set of substantially identical building block elements and wherein each of said routing automata are of substantially identical structure.

17. An inter-computer message routing system wherein message packets are routed among a plurality of computers along communication paths between said computers in an n-dimensional network of said communication paths, different groups of said communication paths comprising different ones of the n dimensions of said network, said message packets each comprising a header containing successive routing directions relative to successive computers along a selected route in said network, said system comprising:
  a plurality of routers, each router being associated with a corresponding one of said computers, each of said routers comprising n routing automata corresponding to said n dimensions, each of said n routing automata having plural message packet inputs and plural message packet outputs, at least some of said inputs and outputs being connected to respective communication paths of the corresponding one of said n dimensions, said n routing automata being connected together in cascade from a message packet output of one to a message packet input of the next one of said routing automata corresponding to a sequence of dimensions of the routing automata;
  routing logic means disposed within each one of said routing automata for directing a message packet received from one of the inputs of said one routing automata to one of said outputs of said one routing automata in accordance with the contents of said header, whereby said routing automata performs all message routing for the message packets traveling in a corresponding one of said dimensions.

18. The system of claim 17 wherein said means for directing said message packet to one of said outputs comprises plural decision element means each having one decision input and plural decision outputs for directing a message packet received at said decision input to one of said decision outputs in accordance with the contents of said header, and plural merge element means having plural merge inputs and a single merge output for directing message packets received at the plural merge inputs thereof to said merge output without interference between said message packets.

19. The system of claim 18 wherein within a single one of each routing automata at least some of said decision inputs are connected to respective message packet inputs, at least some of said merge inputs are connected to respective decision outputs and at least some of said merge outputs are connected to respective message packet outputs.

20. The system of claim 19 wherein:
  travel by said message packets along said paths is mono-directional and said system is one of a group of networks comprising 2-dimensional mesh networks and 3 dimensional torus networks;
  there are two message packet inputs in each routing autotmata comprising one message packet input which receives message packets traveling in the corresponding dimension and another message packet input connectable to a message packet output of a preceding routing automata connected in cascade therewith; and
  there are two message packet outputs in each routing automata comprising one message packet output which transmits message packets for travel in said corresponding dimension and another message packet output connectable to a message packet input of a succeeding routing automata in cascade therewith.

21. The system of claim 17 wherein:
  travel by said message packets along said paths is bi-directional;
  there are three message packet inputs in each routing autotmata comprising first and second message packet inputs which receive message packets traveling in first and second directions in the corresponding dimension respectively, and a third message packet input connectable to a message packet output of a preceding routing automata connected in cascade therewith; and
  there are three message packet outputs in each routing automata comprising first and second message packet outputs which transmit message packets for travel in first and second directions in said corresponding dimension respectively, and a third message packet output connectable to the third message packet input of a succeeding routing automata in cascade therewith.

22. The system of claim 17 wherein each of said computers comprise an integrated circuit including the corresponding router, a processor, a memory, a packet interface connected to said router and a bus connecting said packet interface, said memory and said processor, wherein:
  said processor comprises means for retrieving information data from said memory to be routed in said network in a message packet and for computing an initial header based upon destination instructions stored in said memory; and
  said packet interface comprises means for forming a data stream comprising said information data and said initial header and transmitting said data stream to said router connected thereto as a message packet.

23. The system of claim 18 wherein:
  said network is one-dimensional and comprises an asynchronous pipeline of succesive ones of said computers in which said routers are connected in a cascaded succession of routers each comprising one routing automata; and
  said routing logic means comprises means for providing an asynchronous request signal to a successive one of said routing automata.

24. The system of claim 18 wherein said plural decision element means are a first set of substantially identical building block elements, said plural merge element means are a second set of substantially identical building block elements and wherein each of said routing automata are of substantially identical structure.

25. A computer node chip for use in an inter-computer message routing system wherein message packets are routed among a plurality of such computer node chips along communication paths between said computer node chips in an n-dimensional network of said communication paths, different groups of said communication paths comprising different ones of the n dimensions of said network, said message packets each comprising a header containing successive routing directions relative to successive computer node chips along a selected route in said network, said computer node chip comprising:
- a router comprising n routing automata corresponding to said n dimensions, each of said n routing automata having plural message packet inputs and plural message packet outputs, at least some of said inputs and outputs being connected to respective communication paths of the corresponding one of said n dimensions, said n routing automata being connected together in cascade from a message packet output of one to a message packet input of the next one of said routing automata corresponding to a sequence of dimensions of the routing automata;
- routing logic means disposed within each one of said routing automata, said routing logic means comprising means for reading the header of a message packet received from one of the inputs of said one routing automata, means for directing said message packet to one of said outputs of said one routing automata in accordance with the contents of said header, and means for modifying said header to reflect the passage of said message packet through said one routing automata, whereby each of said routing automata performs all message routing for the message packets traveling in a corresponding one of said dimensions;
- a processor;
- a memory; and
- a packet interface connected to said router and a bus connecting said packet interface, said memory and said processor, wherein said processor comprises means for retrieving information data from said memory to be routed in said network in a message packet and for computing an initial header based upon destination instructions stored in said memory, and said packet interface comprises means for forming a data stream comprising said information data and said initial header and transmitting said data stream to said router connected thereto as a message packet.

26. The chip of claim 25 wherein:
said means for directing said message packet to one of said outputs comprises plural decision element means each having one decision input and plural decision outputs for directing a message packet received at said decision input to one of said decision outputs in accordance with the contents of said header, and plural merge element means having plural merge inputs and a single merge output for directing message packets received at the plural merge inputs thereof to said merge output without interference between said message packets; and
within a single one of each routing automata at least some of said decision inputs are connected to respective message packet inputs, at least some of said merge inputs are connected to respective decision outputs and at least some of said merge outputs are connected to respective message packet outputs.

* * * * *